Jan. 9, 1968 — A. R. TRIPP — 3,362,499
VEHICLES FOR TRAVELLING OVER A SURFACE
Filed Jan. 27, 1965 — 4 Sheets-Sheet 1
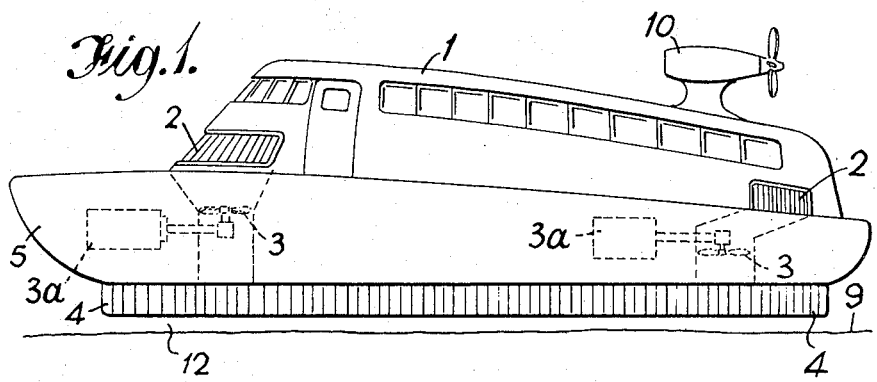
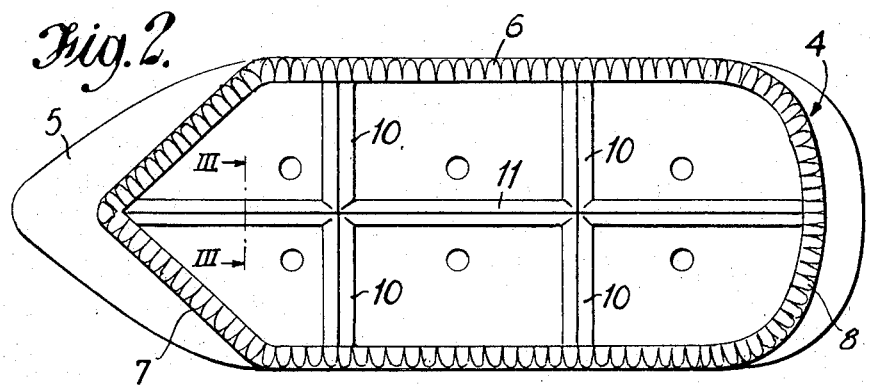
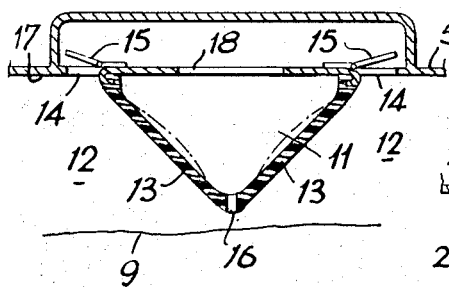
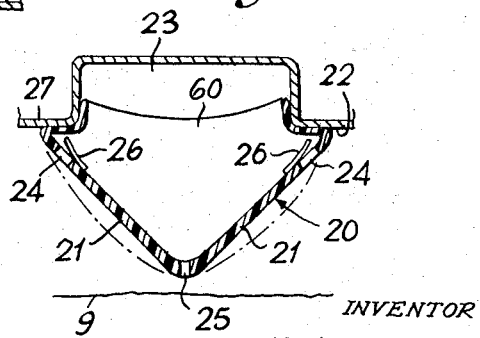
INVENTOR
A. R. TRIPP
BY Cameron, Kerkam & Sutton
ATTORNEYS

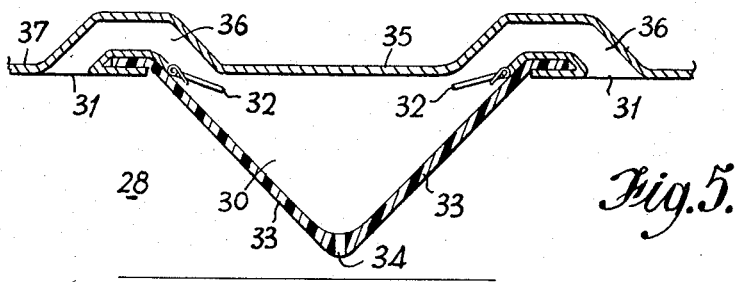
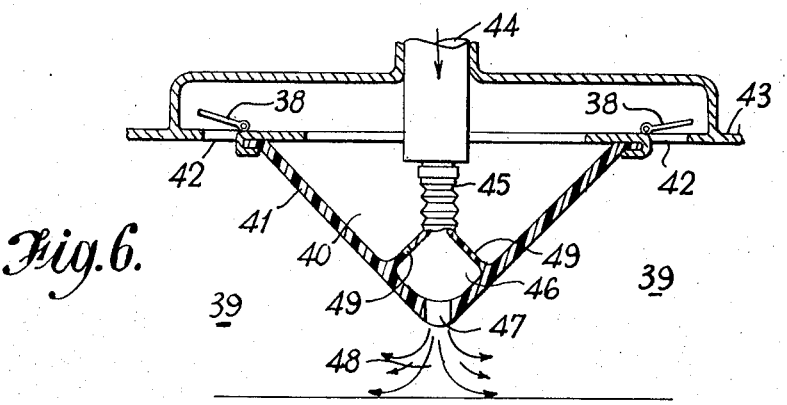
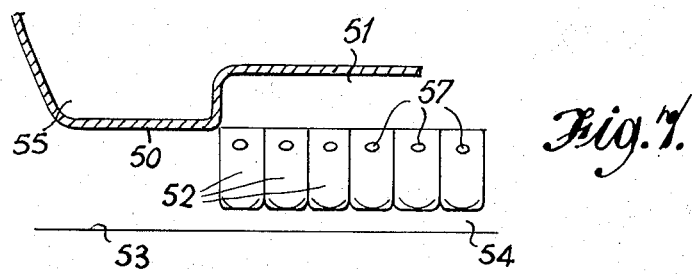
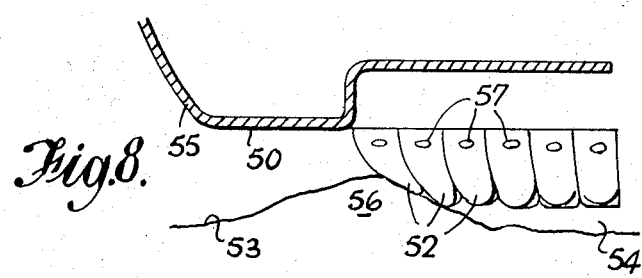

Jan. 9, 1968 A. R. TRIPP 3,362,499
VEHICLES FOR TRAVELLING OVER A SURFACE
Filed Jan. 27, 1965 4 Sheets-Sheet 3
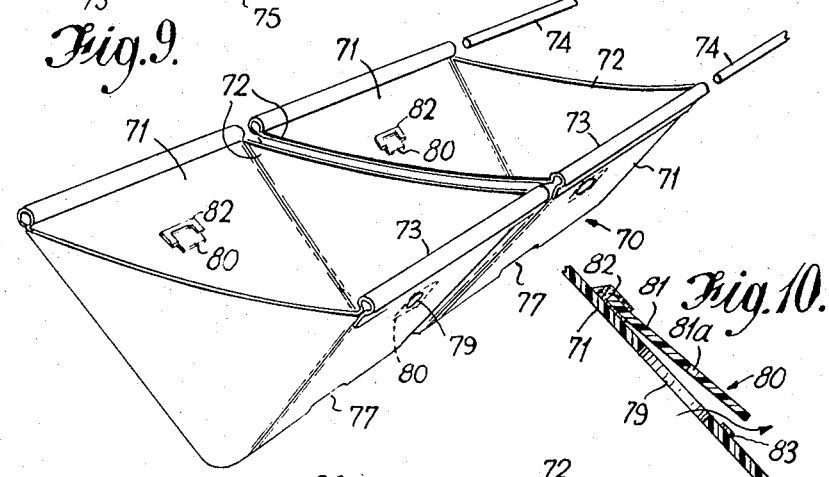
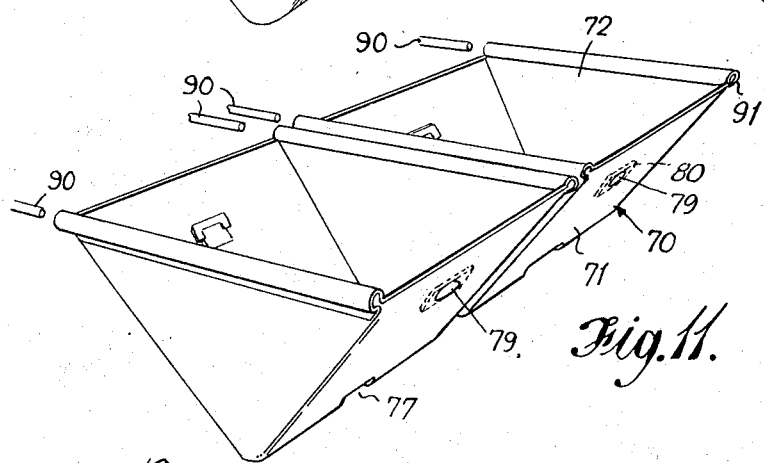
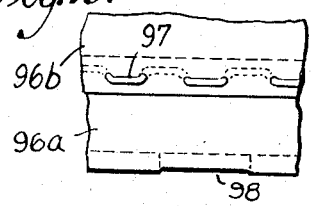
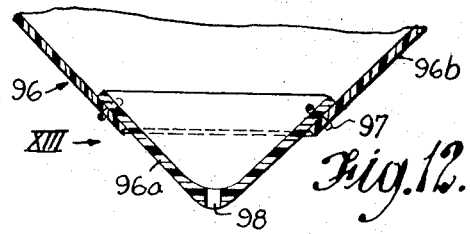
INVENTOR
A.R. TRIPP
BY
Cameron, Kerkam & Sutton
ATTORNEYS United States Patent Office 3,362,499
Patented Jan. 9, 1968

3,362,499
VEHICLES FOR TRAVELLING OVER
A SURFACE
Alan Ritson Tripp, Southampton, England, assignor to
Hovercraft Development Limited, London, England,
a British company
Filed Jan. 27, 1965, Ser. No. 428,432
Claims priority, application Great Britain,
Jan. 30, 1964, 4,010/64
17 Claims. (Cl. 180—121)

ABSTRACT OF THE DISCLOSURE

An air cushion vehicle wherein the vehicle-supporting cushion is divided, for stability purposes, into cushion compartments by one or more inflated walls depending from the bottom surface of the vehicle body. To prevent sideways collapse of a wall when the vehicle rolls or pitches to one side of the wall, the interior of the wall is connected to the cushion compartments on opposite sides thereof by way of simple non-return valves so that cushion air in the compartment wherein the presssure increases as a result of the rolling or pitching can flow into the wall, instead of collapsing the latter.

---

Figure 14:
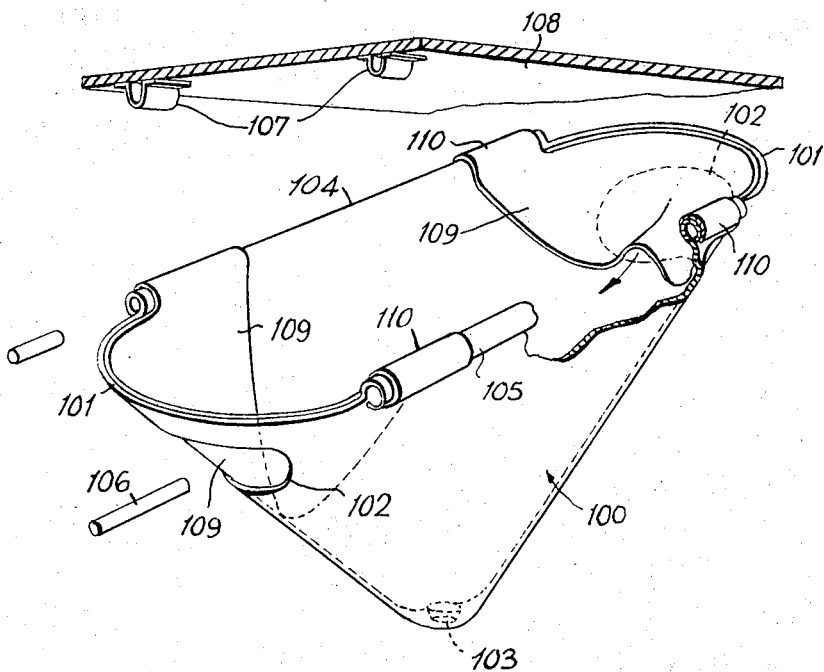

This invention relates to vehicles for travelling over a surface and which, in operation, are supported above that surface at least in part by a cushion of pressurised gas formed and contained beneath the vehicle.

The vehicle-supporting cushion may be divided (for stability purposes) into a plurality of cushion compartments. Compartmentation may be achieved by the use of fluid curtains, by wall members projecting downwardly from the lower parts of the vehicle body or by combinations of wall members and fluid curtains.

To allow a vehicle equipped with wall members to operate over irregular surfaces, for example rough water, a wall member may be of inflatable construction so that it can deflect when brought into contact with surface irregularities. In an attempt to prevent inward collapse of the wall member, due to pressure differentials between cushion compartments, it has been suggested that the wall member be kept inflated to a pressure equal to the highest pressure expected to be reached in a cushion compartment. This highest expected pressure is normally equal to several times the normal cushion pressure and is reached, for example, only when the vehicle is disposed at extreme positions relative to the surface beneath. This means that for a large part of the operating time of a vehicle, the wall member is inflated to a pressure making it very "stiff" and hence possessing little of the deflection property required of it. Furthermore, as the wall member is best made of thin, light, material and as such material has a poor resistance to compressive loads, the wall member can collapse sideways under forces resulting from even small pressure differentials between the cushion compartments on opposite sides of the wall member, but sufficient to apply a compressive overload to the side of the wall member adjacent the "low" pressure compartment.

According to the invention a vehicle for travelling over a surface and which, in operation, is supported above that surface at least in part by a cushion of pressurised gas formed and contained in a space beneath the vehicle and divided into cushion compartments by at least one inflatable wall member attached to the lower part of the vehicle body, is provided with gas flow access means which allow restricted exchange flows of gas between the interior of the wall member and each of the cushion compartments, whereby the wall member may be inflated to a pressure at least equal to the mean of the pressures existing in said cushion compartments.

The flow restriction means may include non-return valves or flow restriction orifices.

The inflatable wall member may, in accordance with the invention, comprise a continuous wall member, the upper rim of which is attached to the lower part of the vehicle body. The width of the wall member and the extent to which it projects downwardly will be governed by the height which the vehicle is to be supported above a surface by the cushion compartments contained thereunder.

The wall member may be divided internally into separate compartments by one or more flexible partitions attached, for example, to the lower part of the vehicle body, being disposed substantially normal to the sides of the wall member and extending to the bottom thereof to form the compartments.

The invention may also comprise a row of such wall members attached to the lower part of the vehicle body. If of oblong horizontal cross-section, the greater horizontal axis of each wall member is preferably disposed substantially normal to the longitudinal axis of the row.

The shape of an inflatable wall member (or members) may vary in accordance with particular operating requirements for the vehicle, although in a particular embodiment of the invention a vertical section taken normal to the longitudinal axis of the member will be that of an isosceles triangle, the base of the triangle being attached to the lower part of the vehicle.

The invention will be understood from the following description of certain embodiments in conjunction with the accompanying drawings in which:

FIGURE 1 is a side elevation of one particular form of a vehicle, embodying the invention, FIGURE 2 is an inverted plan of the vehicle of FIGURE 1, FIGURE 3 is a vertical section on the lines III—III of FIGURE 2, FIGURE 4 is a vertical section similar to that of FIGURE 3 illustrating an embodiment of the invention incorporating a fluid reservoir, FIGURE 5 is a vertical section similar to that of FIGURE 3 illustrating the modification of the embodiment illustrated in FIGURE 3, FIGURE 6 is a vertical section similar to that of FIGURE 3 illustrating an embodiment of the invention incorporating fluid curtain supply nozzle and ducting means, FIGURES 7 and 8 are side views of another embodiment, FIGURE 9 is an exploded perspective view of a further embodiment, FIGURE 10 is a detail, in section, of the embodiment of FIGURE 9, FIGURE 11 is a modification of the embodiment of FIGURES 9 and 10, FIGURE 12 is a side view, in section, of a modification of any of the embodiments of FIGURES 1 to 11, FIGURE 13 is a scrap view looking in the direction of the arrow XIII of FIGURE 12, and FIGURE 14 is an exploded perspective view illustrating a further embodiment.

FIGURE 1 illustrates a vehicle 1 of the so-called plenum chamber type, in which a cushion 12 of pressurised air is formed and contained in a space beneath the vehicle, air being drawn in through intakes 2 by propellers 3 driven by engines 3a, and fed to the cushion space. The cushion is contained at its periphery by a flexible wall structure 4 depending from the vehicle body 5. The vehicle is propelled over a surface 9 by a jet-engine 10.

FIGURE 2, shows the wall structure 4 to comprise flexible members 6, 7 and 8 of the type disclosed by co-pending applications Ser. No. 267,695, filed Mar. 25, 1963, now abandoned, and Ser. No. 566,948, filed July 21, 1966. The flexible members 6, 7, 8 are positioned along both sides, and the fore and aft ends respectively of the periphery of the vehicle body 5. Inflatable flexible wall members 10, 11, each of similar construction, are attached to the lower surface of the body 5, to compartment the cushion 12. The compartmenting wall members 10 are disposed normal to the fore and aft axis of the vehicle body 5 and the wall member 11 parallel thereto.

FIGURE 3 shows an inflatable wall member 11, which has the shape, in vertical cross-section normal to its longitudinal axis, of an isosceles triangle, disposed apex downwards. The triangular cross-section ensures little drag when the bottom of the wall member 11 is brought into contact with the surface 9 beneath the vehicle. The wall member 11 divides the cushion 12 into cushion compartments and has side walls 13 formed of single sheets of flexible material, for example, rubberised fabric. The sheets are attached at their upper edges to the lower surface 17 of the body of the vehicle 5. The wall member 11 is inflated via an aperture 18 formed in the body surface 17 cushion space 12. There is also shown diagrammatically air access ports 14 having air flow restriction means 15 associated therewith for allowing air from one cushion compartment, when at a pressure above that within the wall member 11, to pass freely through one access port 14 into the inflatable member 11, the restriction means 15 associated with the other of said port 14 preventing passage of air outwardly from said member 11. The restriction means 15 comprise non-return valves in the form of simple rubber flap valves. The base of the wall member 11 has a water drainage and air-escape or air flow exchange vent 16.

FIGURE 4 illustrates an embodiment of the invention incorporating an air reservoir above the compartmenting wall structure. An inflatable wall member 20 having flexible walls 21 of sheet material is attached to the lower surface 22 of a vehicle 27. The walls of the lower surface 22 above the inflatable member 20 form a concavity 23 having the shape of an inverted trough. The concavity 23 defines an air reservoir. Air access ports 24 having non-return valves 26 associated therewith exist in the walls 21 at or near to their points of contact with the lower surface 22. An air/water vent 25 is provided at the base of the member 20.

FIGURE 5 illustrates an inflatable wall member 30 with air access ports 31 and non-return, spring loaded valves 32. The wall member 30 has flexible walls 33 and an air/water vent 34 at its base. The wall member 30 is attached at its upper edges to the lower surface 35 of a vehicle body 37. The access ports 31 in the lower surface 35 connect, via ducts 36, the interior of the member 30 with the divided compartments of the cushion space 28 on opposite sides of the member. The valves 32 are positioned where the ducts 36 connect with the interior of the wall member 30. The arrangement avoids the use of ports and valves in the walls of the members 30.

FIGURE 6 illustrates an arrangement for incorporating a fluid curtain supply nozzle and associated ducting means with an inflatable wall member. The inflatable wall member 40 has flexible walls 41 and incorporates air access ports 42 with associated non-return valves 38. The upper edges of the walls 41 are attached to the lower surface 43 of the vehicle body. Pressurised air is supplied via a duct 44 and flexible tubes 45 to a supply duct 46 extending along the lower part of the wall member 40. The air issues from a nozzle port 47 in the duct 46 to form a curtain of moving air 48 extending lengthwise along the bottom edge of the wall member 40 and dividing, with the wall member 40, the cushion space 39 into separate compartments. The tubes 45 are spaced apart to allow communication between the interior parts of the wall member 40 on each side of the tubes 45. Air vents 49 allow communication between the respective interiors of the duct 46 and wall member 40. The walls of the duct 46 are of flexible, sheet material.

In the various embodiments so far described, the inflatable wall members are inflatable by cushion air to a pressure equivalent to the higher of the pressures existing in the cushion compartments on opposite sides of a wall member. That is, to a pressure substantially higher than the mean of the pressure differential. A wall member will be able to sustain this inflation pressure without distortion. Should the higher pressure change over from one side of a wall member to the other, no actual variation of the position of the boundary between adjacent cushion compartments will occur. At the same time, should a wall member come into contact with an obstacle, being inflatable, and further being inflatable only to the highest cushion (compartment) pressure, it can readily deflect to return rapidly to its original position. As pressure differentials between opposite cushion compartments act directly across a side of a wall member, the side is not subject to undue compressive loadings, even when the pressure differentials are substantial.

Rapid fluctuations in the value of the higher pressure will cause substantially no variation in the inflation pressure of the wall members, but slower pressure changes will result in variations in the inflation pressure as in-leakage paths are provided by the valved ports and by the vents. The air/water vents also prevent inflation pressures being "locked" within a wall member as may occur if the pressures of cushion compartments fall substantially below the inflation pressure of a wall member. Without a vent of some kind the non-return valves would remain shut until pressure in a cushion compartment rose to equal inflation pressure.

FIGURE 7 shows diagrammatically a side elevation in section of one embodiment of the invention incorporating an air reservoir located above a compartmented wall structure. The arrangement is generally similar to that illustrated in FIGURE 4. The lower surface 50 of a vehicle 55 embodying the invention has a concavity defining an air reservoir 51. A row of discrete inflatable wall members 52 depend downwardly in a fore and aft group from the lower surface 50 of the vehicle body to divide the cushion space 54 beneath into separate compartments. The vehicle 55 is supported above a surface 53 by a cushion of pressurised gas formed in the space 54. The wall members 52 are constructed from sheets of flexible material and the sides thereof are perforated by ports 57 which define flow restriction orifices allowing a restricted exchange of air flow between the interiors of the members 52 and the compartments of the cushion 54. The ports 57 are all of equal size. No non-return valves are provided. The wall members 52 have oblong horizontal cross-sections, the greater horizontal axes of which are disposed normal to the longitudinal axis of the row, so that they deflect easily.

FIGURE 8 illustrates diagrammatically the operation of the embodiment illustrated in FIGURE 7 when movement of the vehicle 55 results in the row of inflatable wall members 52 encountering an obstacle 56 on the surface 53. The wall members 52 deflect to displace air from their interiors upwards into the reservoir 51. This movement of air allows the inflatable wall members 52 to collapse freely and thereby reduce any tendency towards a buffeting action which may otherwise be experienced on encountering obstacles such as waves. Further, as the wall members 52 move over the obstruction 56 the members are deflected up by impact and are then deflected back by build-up of inflation pressure. Air displaced from the wall members 52 as they deflect upwards flows into the reservoir 51. The displaced air replaces air supplied to the wall member interiors to deflect them downwards after passage over the obstacle 56. Exchange flows of air will occur when the wall members 52 are deflected either in a direction normal to the longitudinal axis of the wall structure or in a direction parallel thereto.

It will be seen that as a result of this arrangement any sudden deflection of certain of the inflatable wall members produces a displacement of air into the reservoir above. The increase in the air pressure of the reservoir is then transmitted simultaneously along teh reservoir and into the wall members beyond or aft of those deflected. This provides rapid excess air pressure dispersion. Air dispersion enables the wall members to encounter obstacles or sudden high wave formations without suffering extreme shocks or causing the vehicle to pitch unduly.

It will be appreciated that the internal (i.e. inflation) pressure of a wall member 52 never rises above that value equal to the mean of the pressure differential existing between cushion compartments divided by the wall member. This is because exchange flows of air into and out of the "fixed" ports 57 are substantially equal.

When the vehicle is intended to operate over water, water may accumulate within a wall member when the vehicle is at rest, i.e. unsupported by its cushion. When the cushion is subsequently formed, the accumulated water is then blown out of the wall members through its bottom air/water vents. Water may also enter the wall member interiors (if high wave formations are encountered) through the access means in the side faces of the member.

Any of the above-described embodiments can be modified to provide lateral division of the interior of a wall member into separate compartments.

With reference to FIGURE 4, division can be achieved by fitting a series of lengthwise-spaced flexible partitions 60 into the interior of a wall member. The partitions 60 are disposed normal to the longitudinal axis of the wall member 20 and extend from adjacent the upper parts of the wall member to the bottom edge thereof. The side edges of the partitions are joined to adjacent side faces of the walls 21. The apex of the wall member is preferably 90°. The internal compartments, in the example illustrated, are in open communication with each other through the reservoir 23. The arrangement ensures that, if part of the wall member 20 is ripped away by severe impact with an obstacles, the remainder will continue to function as a dividing wall.

With reference to FIGURE 9, a row of inflatable wall members 70 each comprise joined pairs of side parts 71 and end parts 72. The upper edges of the side parts 71 are formed with loops 73 which locate pairs of support rods 74. The loops may be reinforced by bushes of plastic material. The rods 74 (and hence the wall members 70) are demountably attachable, through brackets 75, to the bottom surface 76 of a vehicle body. The wall members 70 have air/water vents 77 formed by cut-away portions of the bottoms of the side parts 71. The upper edges of the end parts 72 are scalloped, as illustrated, to clear the bottom surface of the vehicle body.

With reference now to FIGURE 10 also, the side parts 71 are apertured to provide gas access ports 79 and simple non-return flap valves 80 allow restricted exchange flows of gas between the interiors 81 of the wall member 80 and each of the cushion compartments without. The valves 80 comprise rectangular sheets 81 of flexible material the upper edges of which are attached to the inner faces of the sides 71 by adhesive and rubber strips 82. To assist the vents 77 in preventing inflation pressures being "locked" within the wall members, or to serve as a substitute for the vents 77, the sheets 81 have vent holes 81a. Alternatively, or in combination, small "stop" members 83 of stud-like form are attached to the sides 71 to prevent the sheets 81 from closing fully.

FIGURE 11 illustrates a modification of the arrangement of FIGURES 9 and 10 and shows how a row of discrete wall members 70 may be demountably attached to a vehicle body through pairs of cross-wise disposed support rods 90 and loops 91 in their ends 72.

With reference now to FIGURES 12 and 13, a wall member, such as the wall member 96 illustrated, can be made of two-part construction, the lower part 96a being demountably attached to the upper part 96b by lacing 97. As illustrated, adjacent edges of the parts 96a, 96b overlap so that inflation pressure maintains an air seal between the parts. The parts 96a, 96b are made demountable for economic reasons. The lower part of a wall member is the most likely to be damaged and the arrangement provides economic replacement of this part. The wall member 96 is provided with an air-water vent 98.

FIGURE 14 illustrates another embodiment of the invention and shows a cushion-dividing wall member 100, having rounded side parts 101, portions of which are cut away to define air access ports 102. The wall member 100 has the triangular (vertical) cross-section of the wall members described above and the apex angle of the wall member 100 is 90°. The bottom of the wall member 100 is cut away to define an air/water vent 103. The upper edges of the end parts 104 of the member 100 are folded back to form loops 105 which locate support rods 106 for demountable attachment of the wall member 100, through brackets 107, to the bottom surface of a vehicle body 108. The rods 106 transmit tension loads from the wall member 100 to the vehicle body.

Exchange flows of cushion air through the air access ports 102 are restricted by non-return valves 109. The valves 109 comprise sheets of rubberised fabric cut to triangular shapes, with each sheet folded back to form the U-like configuration illustrated. (The valves 109 actually have the same form as a flexible wall member described in the above mentioned applications Ser. Nos. 267,695 and 566,948.) To allow flow into the wall member 100 by way of a port 102 a valve 109 collapses inwardly. (See the right hand valve 109 of the figure.) Outflow through a port 102 is substantially prevented by pressure of air within the wall member 100 holding a valve 109 and adjacent parts of the wall member 100 together. The upper edges of the valves 109 are folded back to form loops 110 which encircle adjacent parts of the loops 105. An angle of 90° is defined by the bottoms of the side parts of a valve 109. Tension loads are transmitted from a valve 109 to the vehicle body 108 by way of rods 106.

The wall members may also be modified so that they are concave or convex in vertical cross-sections, as indicated by dotted lines in FIGURES 3 and 4 respectively. They may also be rectangular, trapezium or rounded form, but these shapes carry drag penalities. The apex angle of a wall member, when of triangular cross-section, is preferably 90° or more. This ensures that tensions in the side parts are transmitted through the end parts (or partions, where fitted) to the bottom surface 17, 22 of the vehicle body, in the manner described in applications Ser. Nos. 267,695 and 566,948. The invention has a further advantage over a vehicle provided with a wall member inflated from a source other than the vehicle-supporting cushion. In the latter arrangement, in the event of the wall member sustaining damage resulting in rupture, high pressure inflating gas will escape into the cushion space raising the pressure of the cuhion substantially. This cannot happen to a vehicle according to the invention.

I claim:
1. A vehicle for travelling over a surface and which, in operation, is supported above that surface at least in part by a cushion of pressurized gas formed and contained in a space beneath the vehicle, comprising at least one inflatable wall member attached to the underside of the vehicle body dividing said space into a plurality of cushion compartments, and non-return valve means which allow non-return flows of cushion gas from the cushion compartments to the interior of the wall member when the pressure existing in said cushion compartments exceeds that within the wall member.

2. A vehicle as claimed in claim 1 including gas reservoir means in open communication with the interior of the wall member.

3. A vehicle as claimed in claim 2 wherein said gas reservoir means comprises a concavity in that part of the vehicle body disposed immediately above the wall member.

4. A vehicle as claimed in claim 1 including means for causing a curtain of moving fluid to issue downwardly from the bottom edge of the wall member to assist said wall member in dividing the space occupied by the vehicle-supporting cushion.

5. A vehicle as claimed in claim 4 wherein said last mentioned means includes means defining a supply port structure in the bottom of the wall member, means providing a source of pressurized fluid, and duct means connecting the supply port with the fluid source.

6. A vehicle as claimed in claim 1 including gas vent means formed in the bottom edge of the wall member.

7. A vehicle as claimed in claim 1 including stop members for preventing the valves of said non-return valve means from closing fully.

8. A vehicle as claimed in claim 1 including gas vent means defining vent paths extending from one side of said non-return valve means to the opposite side thereof.

9. A vehicle as claimed in claim 1 including flexible partition means dividing the interior of the wall member into separate compartments, said flexible partition means being disposed substantially normal to the sides of the wall member.

10. A vehicle as claimed in claim 1 wherein the wall member has a vertical cross-section, taken normal to the longitudinal access of the wall member, of downwardly and inwardly-tapering form.

11. A vehicle as claimed in claim 10 wherein said vertical cross-section is substantially that of an isosceles triangle disposed apex downwards.

12. A vehicle as claimed in claim 10 wherein said vertical cross-section is substantially that of an isosceles triangle disposed apex downwards, the angle of the apex being substantially 90°.

13. A vehicle as claimed in claim 1 wherein the wall member is of two-part construction, comprising a lower part demountably attached to an upper part.

14. A vehicle as claimed in claim 13 wherein adjacent edges of the upper and lower parts overlap and the lower part is demountably attached to the upper part by lacing interconnecting said parts.

15. A vehicle as claimed in claim 1 wherein the non-return valve means include sheets of flexible material attached to the walls of the wall member.

16. A vehicle as claimed in claim 1 including a succession of said wall members, movable relative to each other.

17. A vehicle as claimed in claim 16 wherein the wall members of the succession are of oblong horizontal cross-section, the greater horizontal axis of each wall member being disposed normal to the longitudinal axis of the row.

References Cited
UNITED STATES PATENTS
3,291,238   12/1966   Eggington.

A. HARRY LEVY, *Primary Examiner.*